United States Patent [19]

Abt

[11] Patent Number: 4,555,969
[45] Date of Patent: Dec. 3, 1985

[54] PANEL SAWING APPARATUS

[75] Inventor: Anton Abt, Oberboihingen, Fed. Rep. of Germany

[73] Assignee: Reich Spezialmaschinen GmbH, Nuertingen, Fed. Rep. of Germany

[21] Appl. No.: 486,661

[22] Filed: Apr. 20, 1983

[30] Foreign Application Priority Data

May 3, 1982 [DE] Fed. Rep. of Germany ....... 3216441
Feb. 12, 1983 [DE] Fed. Rep. of Germany ....... 3304877

[51] Int. Cl.$^4$ .............................................. B26D 1/14
[52] U.S. Cl. ................................ 83/471.3; 83/486.1; 83/824
[58] Field of Search ................ 83/471.2, 471.3, 486, 83/488, 462, 455, 574, 485, 489, 821, 824, 829; 308/3 A, 3 CH, 3.9, 6 A, 6 R, DIG. 10

[56] References Cited

U.S. PATENT DOCUMENTS 3,622,211 11/1971 Mitton .............................. 308/6 R
3,749,455 6/1973 Meier ................................. 308/6 R
3,866,496 2/1975 Payne ................................ 83/471.3
4,202,231 5/1980 Striebig ............................. 83/471.2

Primary Examiner—James M. Meister
Assistant Examiner—John L. Knoble
Attorney, Agent, or Firm—W. G. Fasse; D. H. Kane, Jr.

[57] ABSTRACT

A circular panel saw is supported by a slide (7) slidably mounted for up and down movement on a guide carriage (2) which in turn is mounted for horizontal back and forth movement on a substantially upright frame or rack (1). The guide carriage (2) has a carriage head (3) connected to a carriage foot (4) by a support beam (5) and an abutment beam (6) extending in parallel to each other and made of conventional sectional steel. These beams (5, 6) are die drawn or bright drawn whereby an inexpensive and simple construction of the guide carriage is possible. The die drawn beams require very little machining and a small or hardly any readjustment. Yet, the present saw makes accurate, straight cuts.

8 Claims, 3 Drawing Figures

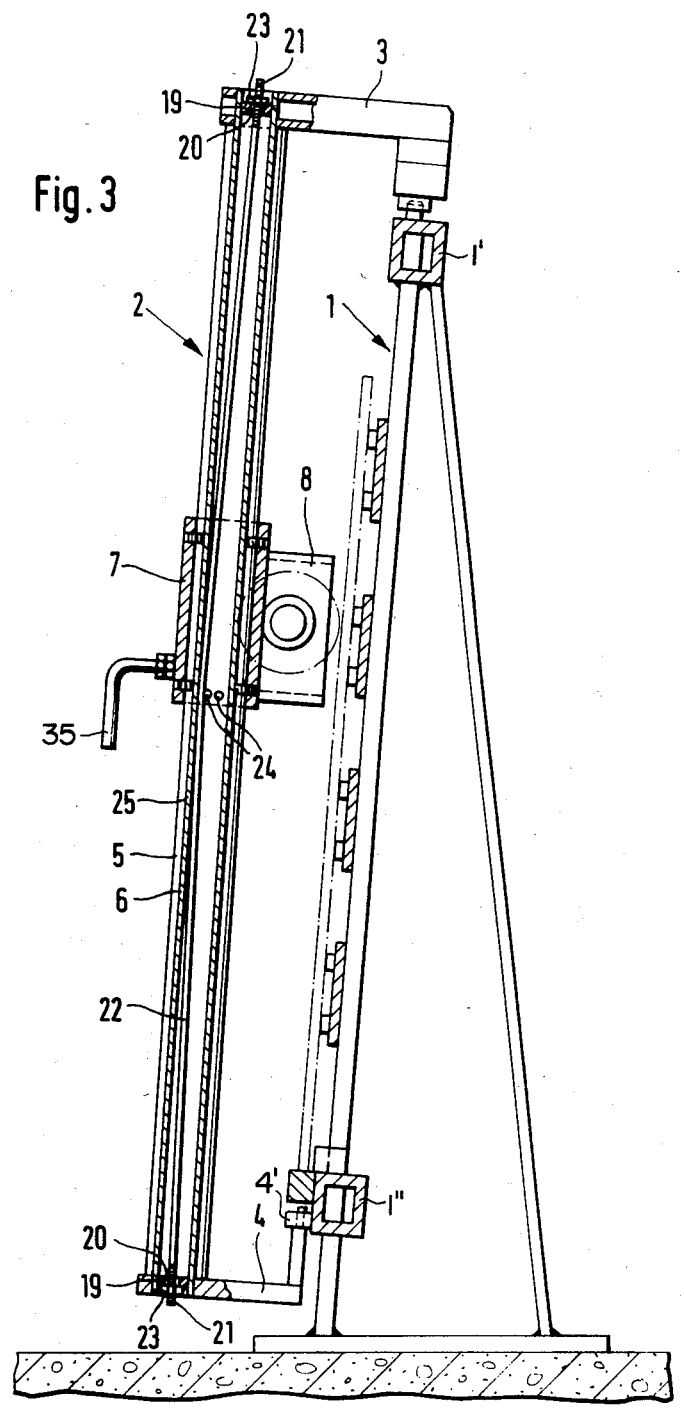

PANEL SAWING APPARATUS

BACKGROUND OF THE INVENTION

The invention relates to a panel sawing apparatus having a substantially upright panel supporting rack or frame on which a guide carriage for a circular saw is movable back and forth, preferably in the horizontal direction while a saw slide carrying the circular saw is movable up and down along the guide carriage.

It is known in connection with panel saws having an upright or substantially upright rack to provide a guide carriage which is movable horizontally and in parallel to the frame or rack for performing a horizontal cut through a panel. In such a known structure the guide beam for guiding the tool slide is a composite hollow beam having a rectangular cross-section and assembled as a welding construction. Such construction is involved and expensive because the welding heat may cause structural changes so that the guideways for the tool slide must be machined on a special parallel planing machine having a capacity for handling a work piece of substantial length. Such machining further adds to the expense of prior art constructions of this type.

OBJECTS OF THE INVENTION

In view of the above it is the aim of the invention to achieve the following objects singly or in combination:

to construct a panel saw in such a way that its guide carriage is simple in its structure and hence inexpensive to manufacture;

to assure a straight sawing cut by simple adjustment means for the guide carriage;

to substantially avoid any machining or reduce such machining to a minimum by using die drawn tubular sectional steel members for the guide bar or beam and for an abutment beam;

to provide for a slight elastic yielding between the support guide beam and its guide bearing; and to provide adjustment means for compensating slight bending of the support or guide beam and any abutment beam extending in parallel to the guide beam.

SUMMARY OF THE INVENTION

According to the invention the present panel sawing apparatus comprises a guide carriage including a carriage head and a carriage foot interconnected by at least one support beam made of a single piece of a tubular commercially available sectional steel member and by an abutment beam extending parallel to the support or guide beam, whereby the guide carriage is movable along the above mentioned frame or rack, and whereby the tool slide carrying the circular saw is adjustable along the interconnecting support beam of the guide carriage.

By using a commercially available tubular member having a circular cross-section for the support beam and a commercially available tubular member having a rectangular cross-section for the abutment beam, the invention achieves an especially simple and hence inexpensive construction. Preferably, both beams are of the die drawn or bright drawn type which are readily available as standard shelf items. It has been found that these tubular members of the die drawn type have such a dimensional precision that only a small machining or adjustment will satisfy the conditions that must be met by a guide beam with regard to its cross-section and with regard to the straightness of the saw cut to be made.

The guiding of the tool or saw slide on the guide carriage, or rather on the support beam of the guide carriage by means of an upper set of three guide bearings and a lower set of three guide bearings comprising ball bearings results in a further simplification of the manufacturing of the present panel sawing apparatus. The precise adjustment of the disposition without play between the tool slide and the support beam is accomplished according to the invention by mounting one of the guide bearings in an eccentric bearing bushing. Additionally, this one guide bearing is mounted on a mounting member which is relatively long and thin as compared to the guide bearing width so that this guide bearing may slightly yield to a predetermined force, for example, if sawdust or other contaminants are located between the guide bearing and the support beam or if the support beam should be subject to minor deviations from its dimensional stability or from its predetermined dimensions.

By providing adjustable tensioning means for the beams of the guide carriage, it is possible that the support beam has initially a slight bending which is compensated according to the invention so that it is prevented from being transmitted to the saw cut and thus it is prevented from impairing the straightness of the saw cut.

The adjustable tensioning means arranged for example inside the hollow abutment beam, make it possible to compensate the bending of the guide or support beam by an intended bending of the abutment beam so that the resulting saw cut made by the apparatus in a straight cut extending perpendicularly to a reference line. These tensioning means in combination with the above outlined saw construction result in a simple and hence inexpensive panel saw which, nevertheless, has a high cutting precision.

BRIEF FIGURE DESCRIPTION

In order that the invention may be clearly understood, it will now be described, by way of example, with reference to the accompanying drawings, wherein:

FIG. 3 is a sectional view along section line III—III in FIG. 1 through the abutment beam extending in parallel to the support or guide beam.

DETAILED DESCRIPTION OF A PREFERRED EXAMPLE EMBODIMENT AND OF THE BEST MODE OF THE INVENTION

Figure 1:
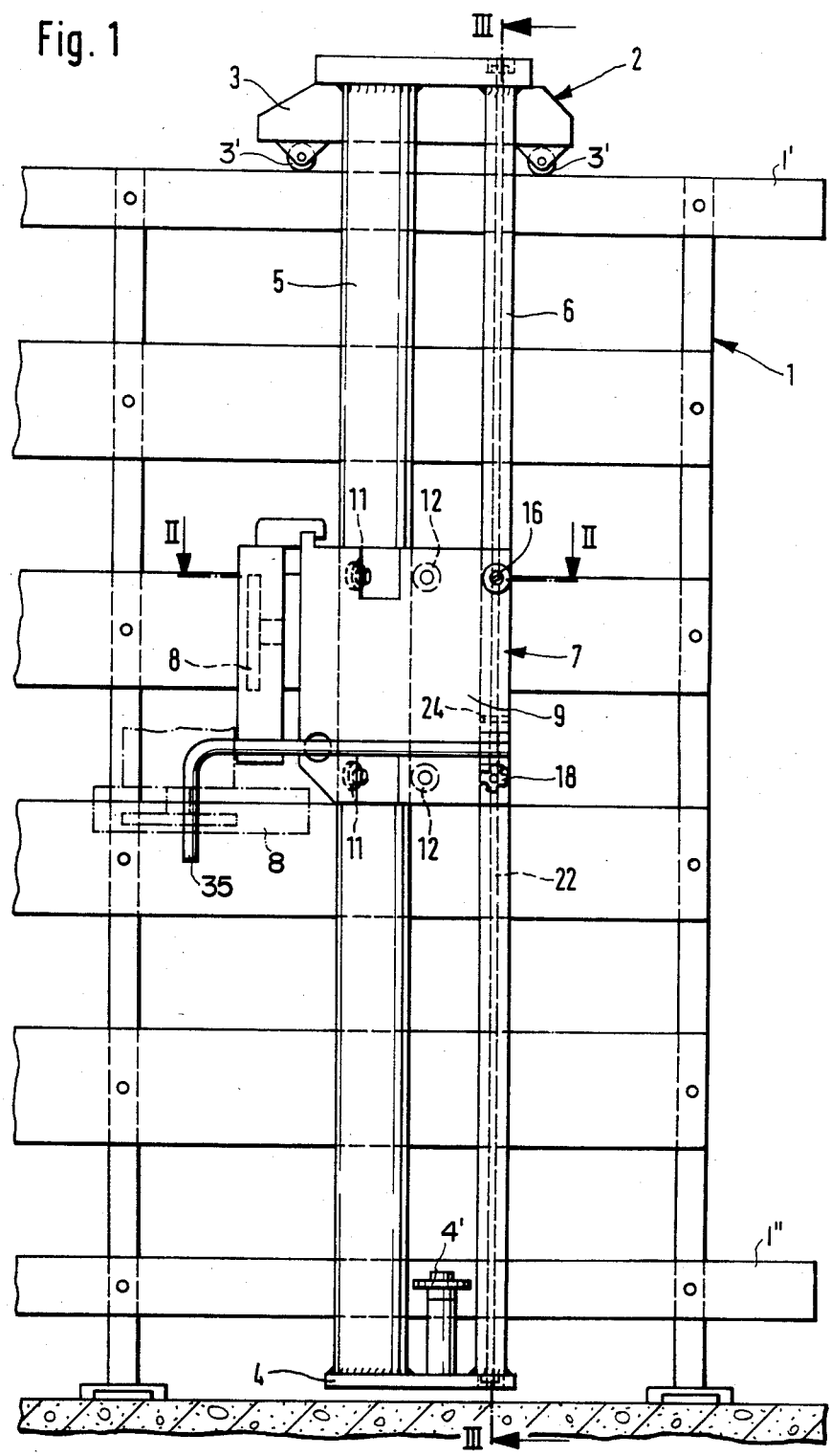
FIG. 1 is a front plan view of the guide carriage according to the invention.

FIG. 1 shows a front view of a substantially upright rack or frame 1 for a circular saw 8. The frame 1 has a top guide rail 1' and a bottom guide rail 1". A guide carriage 2 having a carriage head 3 and a carriage foot 4 is movable horizontally back and forth on the rack 1. For this purpose the carriage head 3 has rollers 3' riding on the top rail 1' and the carriage foot 4 has a guide roller 4' riding on the lower rail 1". The carriage head 3 and the carriage foot 4 are interconnected by a guide or support beam 5 and an abutment beam 6 extending in parallel to the support beam 5. The ends of these beams are welded to the carriage head 3 or to the carriage foot 4 respectively. Both beams 5 and 6 are made of commercially available, standard die drawn or bright drawn tubular, sectional stock. The guide or support beam 5 has a circular cross-section. The abutment beam 6 has a rectangular cross-section.

A tool or saw slide 7 is slidably mounted on the guide or support beam 5 of the guide carriage 2 for an up and down movement. The circular saw 8 is mounted on the tool slide 7 for movement perpendicularly to a plane defined by a panel on the rack as will be described in more detail below with reference to FIG. 2. The circular saw 8 is further adjustable by conventional means not shown in detail from the position shown by dashed lines in FIG. 1 into the position shown by dash-dotted lines in FIG. 1.

Figure 2:
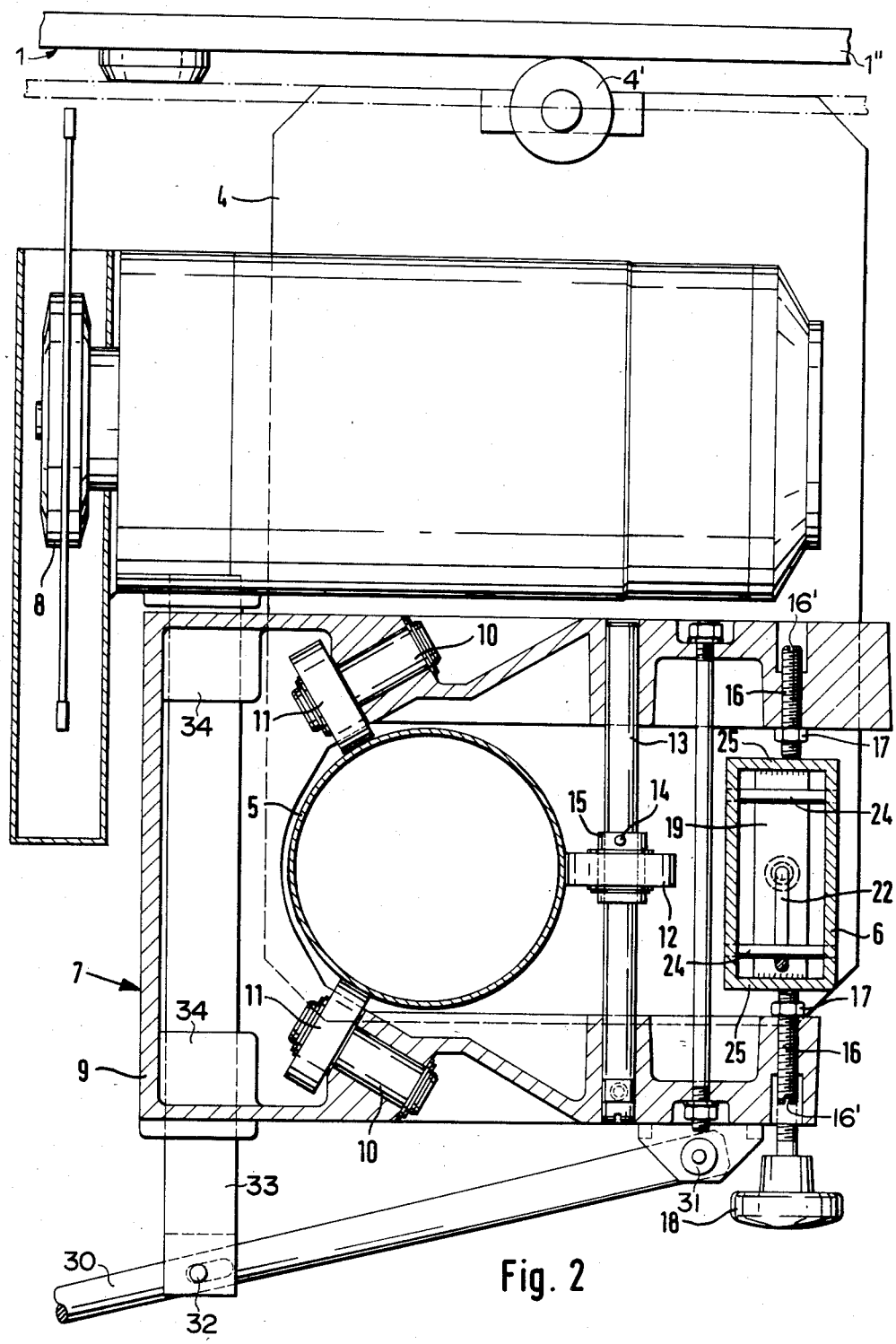
FIG. 2 is a sectional view along section line II—II in FIG. 1 through one set of guide bearings which is identical to the other set.

As shown in FIG. 2 the tool slide or saw carrying slide 7 comprises a housing 9 having mounted therein in its upper portion as well as in its lower portion bearing studs 10 carrying guide bearings 11. A further guide bearing 12 is mounted on a relatively long bearing or support member 13 mounted with both its ends in the slide housing 9. Between its mounted ends the support member 13 has a relatively large free length as compared to the axial width of the guide bearing 12. Thus, the guide bearing 12 may slightly yield elastically, for example if a contamination such as sawdust should be present between the guide bearing 12 and the guide or support beam 5. Further, the guide bearing 12 is adjustable in a direction radially or perpendicularly to the longitudinal axis of the guide or support beam 5, whereby said axis extends perpendicularly to the plane of the drawing of FIG. 2. For this purpose an eccentric bushing 15 is interposed between the support member 13 and secured by a pin 14 so that the guide bearing 12 is held by this eccentric bushing 15. The rotational axis of the bore of the eccentric bushing 15 is displaced relative to the generatrix of the outer cylinder of the eccentric bushing by the adjustment rotation of the bushing 15 with the support shaft member 13 whereby the guide bearing 12 is also displaced perpendicularly to the guide or support beam 5. The guide bearings 11 and 12 are displaced around the circumference of the support beam 5 by spacing angles of 120° and these bearings contact the outer surface of the support beam 5.

Referring further to FIG. 2, the tool slide 7 is prevented from tilting about the longitudinal axis of the guide or support beam 5 by the adjustment screws 16 cooperating with counter nuts 17 and bearing against opposite sides of the abutment beam 6. Preferably the adjustment screws 16 are made of synthetic material. The adjustment screws 16 are inserted into threaded holes of the slide housing 9 and are individually adjustable by the insertion of a screwdriver into the slot 16′ after the respective nut 17 has been loosened. After adjustment, these nuts 17 are tightened again.

As best seen in FIG. 2, the upper end of the slide housing 9 is secured by two opposing adjustment screws 16. The lower end of the slide housing 9 is secured by one adjustment screw on the side facing away from the operator and by a clamping screw 18 facing the operator. The clamping screw 18 may be made of brass or other suitable material. The clamping screw 18 enables the operator to secure the saw slide 7 in an adjusted position for making horizontal saw cuts, whereby further up and down movement of the slide 7 along the support bar 5 of the guide carriage 2 are prevented. When the clamping screw 18 is released, the other screws 16 merely touch the opposing sides 25 of the abutment beam 6, thereby permitting a relative sliding movement of the housing 9 up and down along the abutment beam 6 while still preventing any tilting of the housing 9 about the support or guide beam 5.

FIG. 2 further shows a handle 30 pivoted at 31 to the housing 9 and operatively connected at 32 to a slide member 33 guided in bushings 34 in the housing 9 for adjusting the position of the saw 8 perpendicularly to the plane of a panel. Such adjustment is conventional.

FIG. 3 illustrates the tensioning means 22 which are preferably located inside the hollow abutment beam 6 and which preferably comprise a tension bar, each end of which has a threading 21 extending through a hole 20 in an end plate 19 secured to each end of the abutment beam 6. The holes 20 are aligned with the longitudinal central axis of the abutment beam 6 and the tension bar 22 extends with its threaded ends 21 out of these holes into cooperation with adjustment nuts 23.

As shown in FIGS. 2 and 3 two pegs 24 extend adjacent to each other and slightly spaced from the respective wall of the abutment beam 6 intermediate the ends of this beam 6 so that the tension rod 22 may be held slightly off center between one of these pegs 24 and the adjacent outer wall 25 of the abutment beam 6. Since the two bores 20 are located precisely in the central axis of the abutment beam 6, the tension element or bar 22 can exert a force component extending perpendicularly to the longitudinal axis of the beam 6 when the tensioning nuts 23 are tightened. Thus, the tension bar 22 cooperating with the respective peg 24 is able to bend the abutment beam 6 along an arc. Accordingly, any bend in the opposite direction may be fully compensated to achieve a straight saw cut. Depending on the direction of the bend and the size of the bend in the support or guide beam 5, the tension bar 22 will be inserted to pass between one or the other of the pegs 24 and the adjacent wall 25 of the beam 6. Additionally, the adjustment of the nuts 23 has been found sufficient to bend the beam 6 sufficiently for compensating any bend in the guide or support beam 5.

Incidentally, a handle 35 enables the operator to move the saw slide 7 and with it the saw 8 up or down or horizontally back and forth.

Although the invention has been described with reference to specific example embodiments, it will be appreciated, that it is intended, to cover all modifications and equivalents within the scope of the appended claims.

What is claimed is:

1. A panel sawing apparatus, comprising substantially upright panel supporting rack means (1), guide carriage means (2) slidably mounted on said rack means for a back and forth movement, saw slide means (7) movably mounted on said guide carriage means for up and down movement, said guide carriage means (2) comprising carriage head means (3), carriage guide foot means (4), a support beam (5) and an abutment beam (6) operatively interconnecting said head means (3) and said foot means (4), said beams (5, 6) being made of standard stock sectional steel and extending in parallel to each other, said saw slide means (7) being movably mounted on said support beam (5) for up and down movement on said support beam, further comprising adjustable tensioning means (22) arranged for cooperation with said abutment beam (6) for applying a force to said abutment beam (6) which force is effective substantially perpendicularly to a longitudinal axis of said abutment beam for elastically deforming said abutment beam.

2. The apparatus of claim 1, wherein said abutment beam is a hollow beam, and wherein said adjustable tensioning means are arranged inside said hollow beam whereby the ends of said tensioning means are operatively connected to said abutment beam.

3. The apparatus of claim 2, wherein said tensioning means (22) comprise tension adjustment means (21, 23) at least at one end of said tensioning means (22) between said abutment beam and said tensioning means, and means operatively connecting said tensioning means intermediate its ends to said abutment beam outside a straight line interconnecting the ends of said tensioning means.

4. The apparatus of claim 3, wherein said tension adjustment means are provided at each end of said abutment beam.

5. The apparatus of claim 3, wherein said means operatively connecting said tensioning means to said abutment beam comprise two pages (24) arranged inside said abutment beam intermediate the ends of the abutment beam, said tensioning means selectively contacting one of said pegs.

6. The apparatus of claim 5, wherein said pegs are arranged next to each other, but spaced from each other.

7. The apparatus of claim 1, wherein said adjustable tensioning means comprise a tensioning bar having a threading (21) at least at one of its ends and a threaded nut (23) operatively interposed between said threading (21) and the respective end of said abutment beam.

8. The apparatus of claim 7, wherein said tensioning bar has a threading (21) at each end and, said adjustable tensioning means comprising a threaded nut (23) operatively interposed between each threading (21) and the respective end of the abutment beam.

* * * * *

UNITED STATES PATENT AND TRADEMARK OFFICE
CERTIFICATE OF CORRECTION

PATENT NO. : 4,555,969

DATED : December 3, 1985

INVENTOR(S) : Anton Abt

It is certified that error appears in the above—identified patent and that said Letters Patent is hereby corrected as shown below:

Claim 5, (column 6, line 1), replace "pages" by --pegs--.

Signed and Sealed this

Twenty-fifth Day of March 1986

[SEAL]

Attest:

DONALD J. QUIGG

Attesting Officer

Commissioner of Patents and Trademarks